US012556514B2

(12) United States Patent
Estevez Polo et al.

(10) Patent No.: US 12,556,514 B2
(45) Date of Patent: Feb. 17, 2026

(54) AUTO INFERRING SOURCE/DESTINATION ROLES OF NETWORK ZONES FOR IMPROVED SECURITY POSTURE RECOMMENDATIONS

(71) Applicant: Palo Alto Networks, Inc., Santa Clara, CA (US)

(72) Inventors: Albert Estevez Polo, Barcelona (ES); Didac Gil de la Iglesia, Sant Fost de Campsentelles (ES); Jack Stephen Edmonds, Santa Jose, CA (US); Shuhong Chen, Santa Clara, CA (US); Praveen Tiwari, Milpitas, CA (US); Gaurav Sharma, Mountain View, CA (US); Bhanu Teja Sriram, Roswell, GA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 234 days.

(21) Appl. No.: 18/341,036

(22) Filed: Jun. 26, 2023

(65) Prior Publication Data

US 2024/0430234 A1     Dec. 26, 2024

(51) Int. Cl.
*H04L 9/40* (2022.01)

(52) U.S. Cl.
CPC ...... *H04L 63/0263* (2013.01); *H04L 63/0236* (2013.01); *H04L 63/104* (2013.01)

(58) Field of Classification Search
CPC ............. H04L 63/0236; H04L 63/0263; H04L 63/104
See application file for complete search history.

(56) References Cited

U.S. PATENT DOCUMENTS

| | | | |
|---|---|---|---|
| 2019/0253455 A1* | 8/2019 | Xuan ................. | H04L 41/0894 |
| 2019/0319926 A1* | 10/2019 | Cummins .............. | H04L 41/02 |
| 2021/0044622 A1* | 2/2021 | Venkataramanan ........................ | H04L 63/0209 |
| 2024/0386099 A1* | 11/2024 | Weizman ............. | G06F 21/577 |

OTHER PUBLICATIONS

PCT Application No. PCT/US2024/034501, International Search Report & Written Opinion mailed Sep. 9, 2024, 12 pages.

* cited by examiner

*Primary Examiner* — Gil H. Lee
(74) *Attorney, Agent, or Firm* — Gilliam IP PLLC

(57) ABSTRACT

A security configuration gap analysis system described herein infers roles of source and destination entities of a zone in a network at an organization. The system infers the roles by generating feature values from clustering traffic logs and extracting fields from configuration files of the zone and applying rules to the feature values that output a source/destination role pair. The system additionally compares the identified role pair to best practices to identify security services not implemented or correctly implemented at the firewall for the zone.

20 Claims, 7 Drawing Sheets

500

| Host 1 | Model 1 | | |
|---|---|---|---|
| Source Role | Destination Role | Actions | Recommended Security Services Not Configured | Security Services Configured |
| DMZ | DMZ | View Policies | URL Filtering | DNS, IoT, SaaS, ... |
| Internal Users | Internet | View Policies | URL Filtering, DNS, ... | |

510

| Role to Security Service Mappings | | |
|---|---|---|
| Source Role | Destination Role | Recommended Security Services |
| Data Center | DMZ | Antivirus, URL Filtering, ... |
| Internet | IT Infrastructure | DNS, Antivirus, ... |

520

| Zone to Role Mappings Per-Firewall | | |
|---|---|---|
| Firewall 1 | | |
| Zone Name | System Inferred Role | User Defined Role |
| ImaZone | Internal Branch | (undefined) |
| ImalsoaZone | Internet | (undefined) |

| Security Services | | | |
|---|---|---|---|
| URL Filtering | 10 Firewalls Not Activated | 67 Firewalls Not Configured | 87 Firewalls Not Following Best Practices |

610

| Data Center -> Internet Zone | | | | | |
|---|---|---|---|---|---|
| Not Configured | Rule Name | Source Role | Source Address | Destination Role | Destination Address |
| URL Filtering, DNS, IoT | Rule1 | Source1 | SourceAd1 | Dest1 | DestAd1 |
| URL Filtering, DNS | Rule2 | Source2 | SourceAd2 | Dest2 | DestAd2 |

FIG. 6

AUTO INFERRING SOURCE/DESTINATION ROLES OF NETWORK ZONES FOR IMPROVED SECURITY POSTURE RECOMMENDATIONS

BACKGROUND

The disclosure generally relates to electronic communication techniques (e.g., CPC class H04) and arrangements for maintenance, administration, or management of packet switching networks (e.g., CPC subclass H04L 41/00).

Firewalls that monitor network traffic across an organization have defined security policies that specify allowed applications, allowed source/destination Internet Protocol (IP) addresses, ports for traffic routing, allowed protocols, allowed types/categories of applications and associated risks, etc. These security policies are defined at least in part by the organization and stored in configuration files at the firewalls. Alternatively, such security policies are enforced by the organization and reflected by attributes observed in network traffic by the firewall such as attributes of network traffic flows. Security policies have varying scopes corresponding to physical and virtual interfaces at various entities maintained across the organization.

BRIEF DESCRIPTION OF THE DRAWINGS

Embodiments of the disclosure may be better understood by referencing the accompanying drawings.

FIG. 5 depicts example visualizations of analytics for security configuration gaps.

FIG. 6 depicts additional example visualizations of analytics for security configuration gaps.

DESCRIPTION

Figure 1:
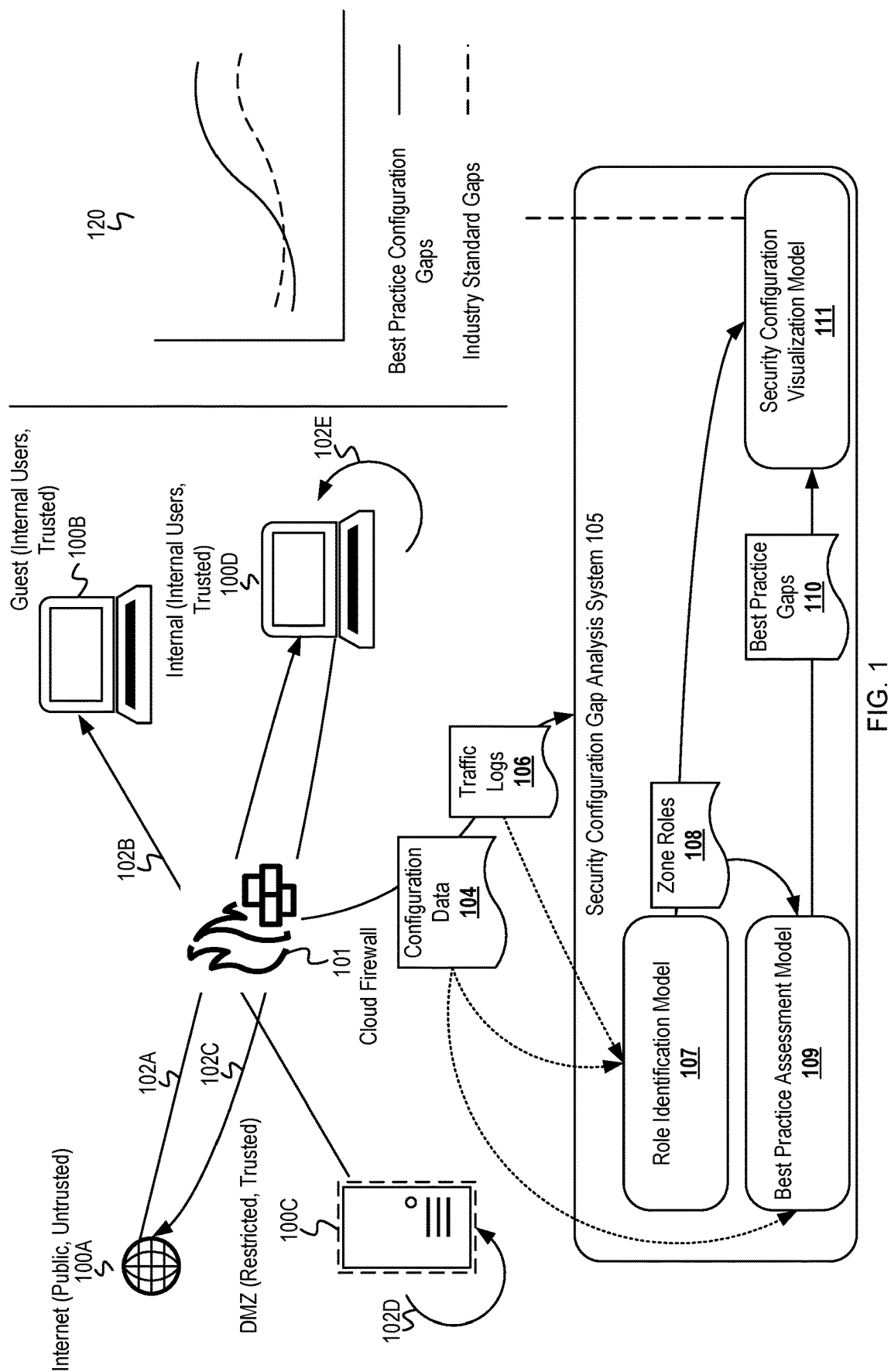
FIG. 1 is a schematic diagram of an example system for identifying security configuration gaps at a cloud firewall based on user-defined zones and corresponding roles for sources and destinations of zones.

The description that follows includes example systems, methods, techniques, and program flows to aid in understanding the disclosure and not to limit claim scope. Well-known instruction instances, protocols, structures, and techniques have not been shown in detail for conciseness.

Terminology

A "zone" or "security zone" as used herein refers to a grouping of physical and/or virtual interfaces of entities managed by an organization. A zone is directional and comprises physical and/or virtual interfaces associated with a set of source entities and physical and/or virtual interfaces associated with a set of destination entities. Security zones have associated security policies that are enforced by a firewall monitoring traffic across the security zones. A "role" or "security role" as used herein refers to a descriptor of a security policy(ies) at a set of source or destination entities interfacing with a zone. An "entity" as used herein refers to a computing device, virtual machine, server, etc. managed by an organization that interfaces with one or more internal or external networks.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Security zones defined by an organization at a firewall monitoring network traffic flows and sessions for the organization comprise a set of physical and virtual network interfaces that, while mutually associated according to logic known to the organization, are not labelled, and roles relating to security privileges and policies at source and destination entities of the security zones are thus unknown. As such, the firewall has no automated recourse for identifying whether each zone is configured according to best practices for its associated roles. When left unchecked by the organization, certain zones lack security services recommended by best practices which leads to gaps in security posture and potential attack vectors for malicious actors.

A security gap analysis system ("system") disclosed herein analyzes traffic flows and configuration files across zones defined at a firewall and infers roles associated with source and destination entities for each zone. The analysis is directional, i.e., the analysis applies to traffic flows originating at source entities and terminating at destination entities across the zone. For a given pair of entities and direction of traffic flow, the system generates a first set of feature values by clustering attributes of flows within a zone captured by traffic logs and a second set of feature values representing configuration settings of the zone that includes metadata from configuration files of organization policy settings at the firewall including allowed applications and their associated risks. The system then infers a pair of roles for the source and destination entities of network traffic over the zone by applying rules to the first and second sets of features, with higher importance given to the first set of feature values due to these feature values being directly observed in network traffic of the organization. The pairs of roles are further associated with confidence scores as a weighted sum of scores generated from the first and second sets of feature values. Using the inferred pairs of roles, the system compares security services implemented by the firewall for the zones to best practice security services for the roles and identifies security services that are not implemented and/or not correctly implemented that represent a gap in security posture for the zone.

Example Illustrations

FIG. 1 is a schematic diagram of an example system for identifying security configuration gaps at a cloud firewall based on user-defined zones and corresponding roles for sources and destinations of zones. A security configuration gap analysis system (system) 105 monitors zones at a cloud firewall 101 to identify roles corresponding to source and destination entities for each of the zones and infer gaps in configuration of security services at each zone according to its source and destination roles based on best practices.

The cloud firewall 101 monitors channels of communication across virtual and physical interfaces that comprise zones 102A-102E. Zone 102A has a source role of the Internet 100A with public access and that is untrusted, and a destination role of an internal network 100D that has internal access within an organization (not depicted) and is trusted. Zone 102B has a source role of a demilitarized zone (DMZ) 100C that has restricted access and is trusted and a destination role of a guest network 100B that has internal access within the organization and is trusted. The DMZ 100C comprises internal servers/databases at an organization with highly restricted access that store sensitive data such as user data, user credentials, etc. Zone 102C has source role of the internal network 100D and destination role of the Internet 100A. Zone 102D has source and destination roles of the DMZ 100C. Zone 102E has source and destination roles of the internal network 100D.

While each of the roles 100A-100D are labelled according to qualitative descriptions of the grouping of associated entities (e.g., servers, endpoints, virtual machines, databases, etc.) for each role that reflect security privileges and policies therein, these qualitative descriptions are not necessarily provided by the organization and, instead, each role is defined as a logical grouping of entities by the organization with associated policies for how to handle incoming and outgoing network traffic at entities associated with each role. For instance, the organization can assign generic labels to zones such as "zone1". The cloud firewall 101 does not have a priori knowledge of how to assign each of the roles 100A-100D. Each pair of roles for a zone has associated best practices for security policies including recommended implementations for various security services across zones that are defined by these qualitative descriptors for source and destination roles of each zone. Consequently, the cloud firewall 101 collects configuration data 104 and traffic logs 106 based on monitoring each of the zones 102A-102E and communicates the configuration data 104 and traffic logs 106 to the system 105 for analysis and identification of security configuration gaps.

The configuration data 104 for a zone can comprise, for various traffic flows corresponding to source and destination entities for the zone, allowed applications, categories of allowed applications, sub-categories of allowed applications, technology areas of allowed applications, associated risk, public and private Internet Protocol (IP) addresses for sources and destinations, single- and multi-hop routes taken by each flow, etc. The configuration data 104 is extracted from configuration files of security policies defined for each zone by the organization. These configuration files can be sparse, with certain fields potentially missing. Consequently, the traffic logs 106 supplement the configuration data 104 based on direct observation of each traffic flow, for example by the cloud firewall 101 capturing logs of network packets from each flow to directly observe allowed applications and their metadata, public and private IP addresses, routing data, etc. The traffic logs 106 are often more descriptive because the organization may configure entities associated with each role to handle flows (e.g., by denying or allowing certain applications) without explicitly specifying these policies in the definition of the role at the firewall.

The system 105 comprises a role identification model 107 that identifies a pair of roles for source entities and destination entities of each zone and a best practice assessment model 109 that compares policies for security services for the zones implemented at the cloud firewall 101 to best practice security service configurations defined for pairs of roles associated with zones to identify security configuration gaps. The role identification model 107 generates feature values from the configuration data 104 and from representatives of clusters of the traffic logs 106 and applies hard-coded rules that infer corresponding pairs of roles from the feature values. The role identification model 107 and its inputs/outputs are described in greater detail in reference to FIG. 2.

Subsequently, the best practice assessment model 109 receives the zone roles 108 and configuration data 104 and identifies, for each zone, (i-) best practice recommended security services not implemented for zones as determined by the source and destination roles identified in the zone roles 108 and (ii-) security policies corresponding to security services not correctly implemented by one or more of the zones according to the zone roles 108 and the configuration data 104. The resulting best practice gaps 110 comprise indications of zones that lack implementation and/or correct implementation of one or more security services and recommendations for the correct implementations of those security services.

Best practice configurations of security services identified by the best practice assessment model 109 depend on both the source and destination roles and the security service being implemented. For instance, for a Uniform Resource Locator (URL) filtering security service, the best practice assessment model 109 can compare blocked URL categories defined by the configuration data 104 for each zone to recommended blocked categories based on the source and destination roles. For the role 102C, blocked URLs can comprise categories of URLs above a threshold risk severity. For the role 102E, blocked URLs can comprise all URLs that do not resolve to private IP addresses. For the role 102D, blocked URLs can comprise all URLs because the organization wants to block all external access from within the DMZ 102D. For a Software-as-a-Service (SaaS) security service, the best practices can comprise lists of allowed SaaS applications corresponding to each pair of roles. For an Internet of Things (IoT) security service, the best practices can comprise a list of allowed device types corresponding to devices at each pair of roles.

The best practice assessment model 109 communicates the best practice gaps 110 to a security configuration visualization model (visualization model) 111. The visualization model 111 generates visualizations of gaps in security configurations for zones at firewalls across an organization. The visualization model 111 allows for sorting of identified gaps in security configurations by cloud firewall, by source/destination role for each zone, etc. The visualization model 111 additionally generates analytics that track the percentage of cloud firewalls with correctly implemented security services over time and compares this percentage with industry-wide averages over time, as indicated in example visualization 120. Additional examples of visualizations are depicted in FIGS. 5 and 6.

Figure 2:
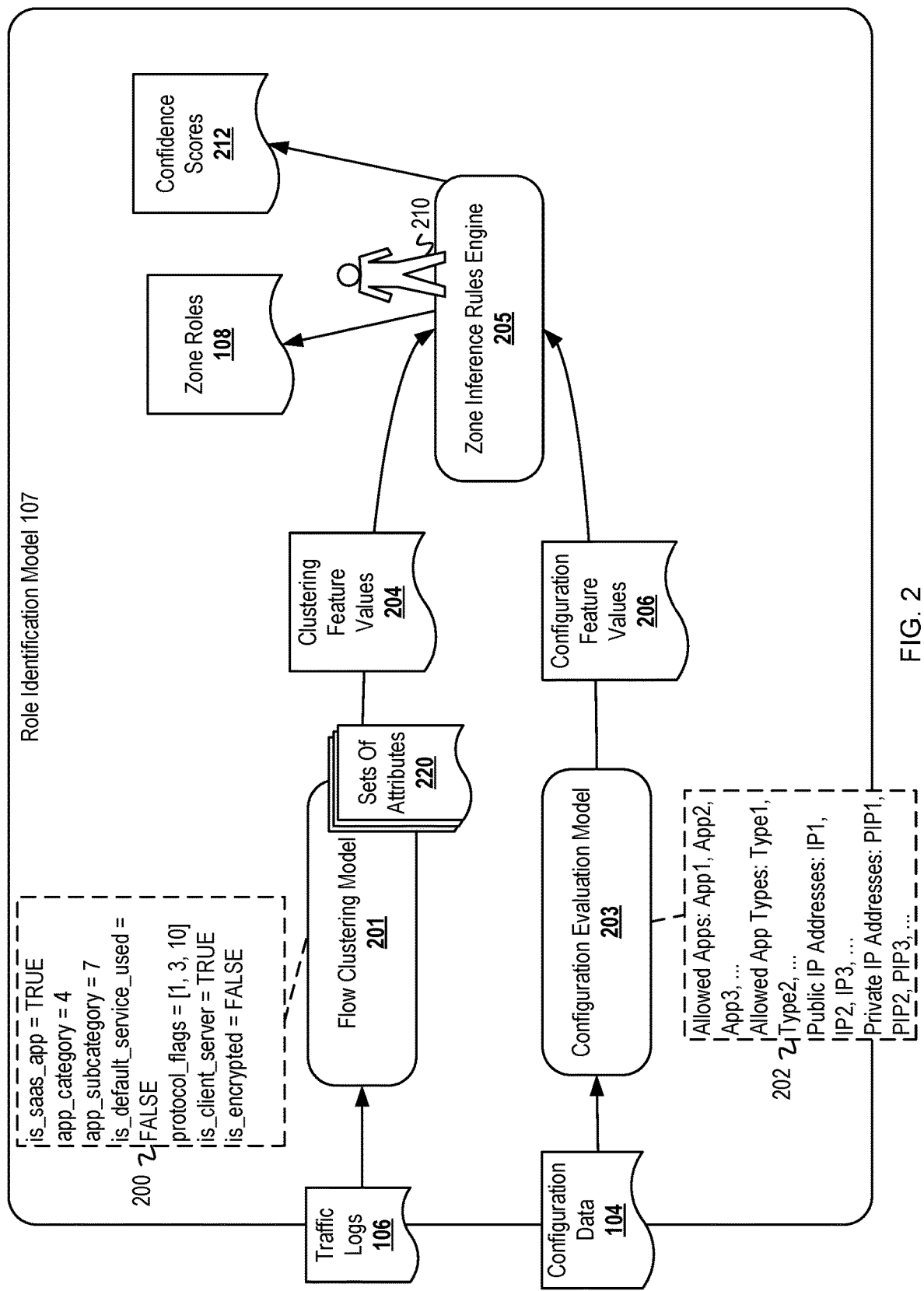
FIG. 2 is a schematic diagram of an example system for inferring roles for source and destination entities of zones with flow clustering and security configuration evaluation.

FIG. 2 is a schematic diagram of an example system for inferring roles for source and destination entities of zones with flow clustering and security configuration evaluation. The role identification model 107 comprises a flow clustering model 201 and a configuration evaluation model 203 that receive traffic logs 106 and configuration data 104 as inputs, respectively. The models 201, 203 generate clustering feature values 204 and configuration feature values 206, respectively, that represent features of network traffic across the zones as well as security policies indicated in configuration files at a firewall that define security characteristics of the zones indicative of potential roles for source and destination. A zone inference rules engine 205 configured by a domain-level expert 210 receives the feature values 204, 206 and uses them to generate zone roles 108 for source and destination of each of the corresponding zones as well as confidence score 212 of each predicted role in the zone roles 108.

The flow clustering model 201 clusters sets of attributes 220 of traffic extracted from flows indicated in the traffic logs 106 and determines representatives of each cluster as the clustering feature values 204. An example representative of a cluster 200 comprises the follow attributes:

is_saas_app=TRUE
app_category=4
app_subcategory=7
is_default_service_used=FALSE
protocol_flags=[1, 3, 10]
is_client server=TRUE
is_encrypted=FALSE The flow clustering model 201 extracts the sets of attributes 220 for each flow and clusters the sets of attributes 220 across flows. The flow clustering model 201 can convert Boolean attributes to numerical attributes and can cluster the resulting numerical attributes in Euclidean space. The flow clustering model 201 can convert attributes that comprise lists such as the protocol_flags attribute above into vectors of 0/1 values that indicate whether the corresponding item is present in the list. For instance, the flow clustering model 201 can convert the vector [1, 3, 10] of protocol flags into the vector [1, 0, 1, 0, 0, 0, 0, 0, 0, 1] to indicate the presence of protocol flags 1, 3, and 10 corresponding to the first, third, and tenth entries in the list. Sets of attributes 220 can vary in number/type of attributes, and in some embodiments attributes can comprise strings that the role identification model 107 can convert into numerical vectors with a natural language processing algorithm, such as the word2vec algorithm.

The flow clustering model 201 generates the sets of attributes 220 from metadata for each flow indicated in the traffic logs 106. The metadata can comprise SaaS or other application identifiers, identifiers of default services, protocol flags, encryption flags, public and private IP addresses, etc. The flow clustering model 201 can further maintain indexes that match application categories and subcategories to application identifiers, risk scores to application identifiers, etc. to generate additional attributes. The flow clustering model 201 applies a clustering algorithm to the sets of attributes 220 and generates a representative set of feature values from each cluster that are aggregated into the clustering feature values 204. The clustering feature values 204 can comprise each representative set of attributes generated from clustering the sets of attributes 220 or can be further processed versions of the representative sets of attributes, for instance by converting string attributes to numerical feature vales with natural language processing, by converting list attributes to vectors, etc. Alternatively, these processing steps can be omitted and/or performed by the flow clustering model 201 prior to clustering when the clustering algorithm implemented is not configured to handle data of multiple types.

Often the role identification model 107 is implemented at a firewall that logs and analyzes thousands or millions of flows a day. In these embodiments, the flow clustering model 201 can cluster sets of attributes 220 for flows with approximate nearest neighbor (ANN) clustering to improve efficiency both in clustering and storage (e.g., using locality-sensitive hashing). The number of clusters can be a predetermined value, can be determined by the clustering algorithm implemented, can depend on the number of applications identified in the traffic logs 106, etc. The role identification model 107 can receive the traffic logs 106 in batches asynchronously from the configuration data 104 according to a schedule (e.g., every day) or based on a prompt by a user to identify and/or update identified roles for source entities and destination entities of one or more roles.

The configuration evaluation model 203 receives the configuration data 104 comprising security policies for zones indicated in configuration files at the firewall and generates configuration feature values 206 comprising metadata fields extracted from the configuration data 104. Example configuration feature values 206 comprise the following:

Allowed apps: App1, App2, App3, . . .
Allowed app types: Type1, Type 2, . . . .
Public IP addresses: IP1, IP2, IP3, . . .
Private IP addresses: PIP1, PIP2, PIP3, . . .

For metadata fields not present in the configuration data 104, the configuration evaluation model 203 can indicate a 'null' or 0 entry. The feature values 206 can overlap with the feature values 204, for instance when same application identifiers, types, protocols, etc. are present.

The zone inference rules engine 205 receives the feature values 204, 206 and generates zone roles 108 comprising a source/destination role pair for each zone based on rules coded by the domain-level expert 210. The zone inference rules engine 205 applies rules to identify role pairs for each zone as zone roles 108 and subsequently generates confidence scores 212 for each zone as weighted combinations of numerical values generated from each of the feature values 204, 206 for the identified source/destination role pair. To exemplify, a rule can comprise:

(has_public_interface or has_default gateway) and
(has_category_general_internet_apps_as_to_zone or
has_category_saas_apps_as_to_zone or
has_technology_browser_based_apps_as_to_zone)

When generating the confidence scores 212, each Boolean feature value can have a weight based on whether the Boolean is true or false for a particular role pair (e.g., 0.5 for false, 0 for true for a source role of DMZ and a destination role of the Internet. The zone inference rules engine 205 can assign higher weights to the clustering feature values 204 than the configuration feature values 206 due to the clustering feature values 204 being directly indicated in network traffic at the corresponding zones. To exemplify, confidence scores for role pairs with destination roles of the Internet can assign high weights to feature values indicating a cloud-based SaaS application due to cloud-based SaaS applications being hosted on the Internet. Confidence scores for source/destination role pairs that enforce encryption can assign high weights to feature values indicating an encrypted protocol for network traffic.

Each of the steps of feature generation by the models 201, 203, and the identifying/updating of zone source/destination role pairs by the zone inference rules engine 205 can occur asynchronously. For instance, the models 201, 203 can continuously generate and update the feature values 204, 206 and, based on a prompt by a user or organization to identify source/destination role pairs for one or more zones, the zone inference rules engine 205 can generate zone roles 108 and confidence scores 212 for the one or more zones and corresponding feature values.

Figure 3:
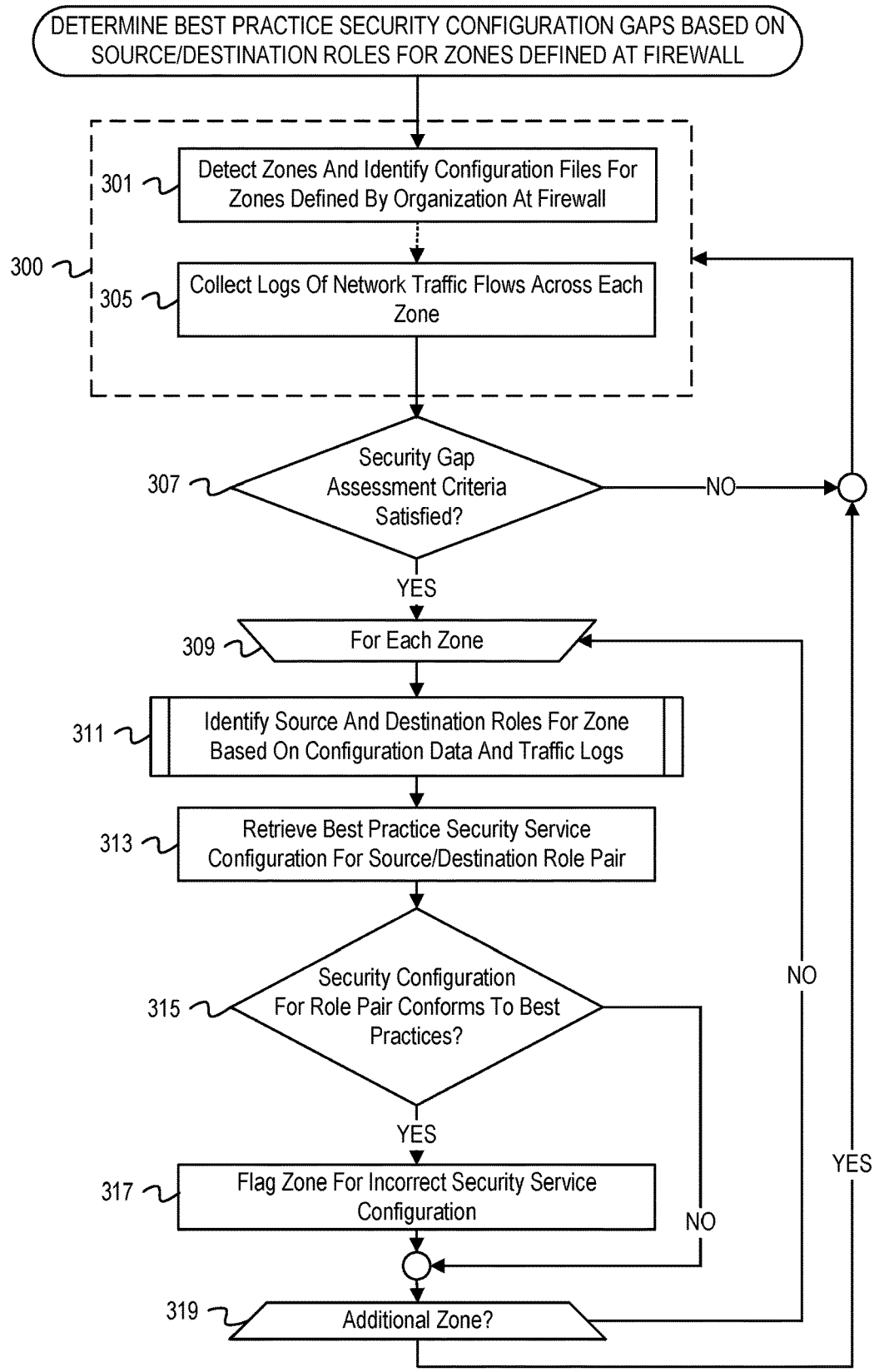
FIG. 3 is a flowchart of example operations for determining best practice security configuration gaps based on source/destination roles for zones defined at a firewall.
Figure 4:
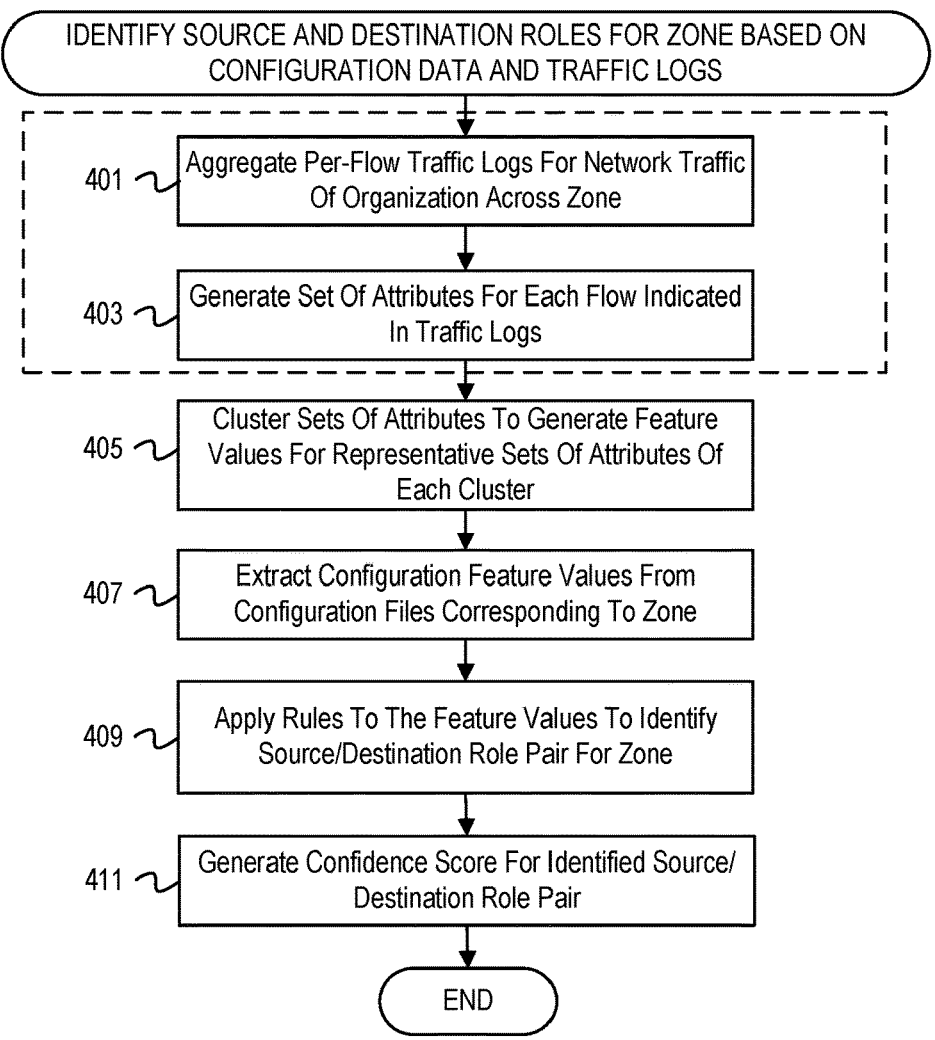
FIG. 4 is a flowchart of example operations for identifying source and destination roles for a zone based on configuration data and traffic logs.

FIGS. 3-4 are flowcharts of example operations for determining security configuration gaps for organization-defined zones at a firewall by identifying source/destination roles for each zone and comparing configurations thereof with best practice security configurations. The example operations are described with reference to a security configuration gap analysis system and a firewall for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for determining best practice security configuration gaps based on source/destination roles for zones defined at a firewall. Blocks 301 and 305 are separated by dashed arrows and encompassed by a dashed block 300. This is to indicate that various operations for detecting organization-defined zones at a firewall, identifying configuration files corresponding to each zone, and collection of logs of network traffic flows across each zone occur asynchronously to each other and to the remaining operations depicted in FIG. 3. Data corresponding to each of the aforementioned steps including data from configuration files and traffic logs can be stored and maintained by multiple components at the firewall, at a security configuration gap analysis system (system), or at other components separated across entities of an organization for which security configuration gaps are identified. Temporary storage for data collected at various components can be implemented depending on operational constraints, for instance when thousands or millions of network traffic flows are monitored across the organization each day.

At block 301, the system detects zones and identifies configuration files for the zones defined by an organization at the firewall. Each zone is defined by the organization (e.g., an administrator of the organization) and is stored in a configuration file(s) at the firewall. Each zone comprises physical and virtual interfaces at entities of the organization corresponding to source and destination entities, for instance as defined by public/private IP addresses and/or ports in the configuration file(s). Each zone is further associated with an identifier, although the identifier may not be descriptive of roles for source and destination entities and instead may comprise a generic identifier such as "zone 1". The firewall can be configured to automatically forward configuration files for newly defined zones to the system and/or the system can be configured to periodically query the firewall for any zones not previously detected.

At block 305, the system and/or firewall collects logs of network traffic flows across each zone. For instance, the logs of network traffic flows can comprise pcap files. The logs of network traffic flows can be sorted/indexed by network traffic flows according to an index of network traffic flows maintained by the firewall. In some embodiments, the logs can be stored by the firewall in temporary memory and discarded when memory is no longer available. Alternatively, the firewall can extract attributes of each network traffic flow such as source/destination IP addresses, application identifiers, application metadata, protocol types, etc. to store in memory instead of from logs from individual packets in each network traffic flow. In some embodiments, logs of network traffic flows are collected only once security gap assessment criteria are satisfied.

At block 307, the system determines whether one or more security gap assessment criteria are satisfied. For instance, the security gap assessment criteria can be that an administrator of the organization queries the system to assess security gaps, that a time period has elapsed since last previous assessment of security gaps (e.g., a week), etc. If the security gap assessment criteria are satisfied, operational flow proceeds to block 309. Otherwise, operational flow returns to block 300.

At block 309, the system begins iterating through zones detected by the system. The zones detected by the system can comprise zones not previously detected by the system, zones that have previously flagged security configuration caps, any combination thereof, all known zones to the system, etc.

At block 311, the system identifies source and destination roles for the zone based on configuration data and traffic logs. The operations at block 311 are described in greater detail in reference to FIG. 4.

At block 313, the system retrieves a best practice security service configuration for the source/destination role pair. The best practice security service configuration comprises best practice security services to implement for each source/destination role pair as well as incorrect implementations for existing security services as defined by a domain-level expert. Note that each best practice security service configuration corresponds to an ordered pair of roles and best practices for a (DMZ, Internet) source/destination role pair may differ from a (Internet, DMZ) pair. To exemplify, best practice security services to be correctly implemented for a (Internet, Intranet) source/destination role pair can comprise URL filtering services, antivirus and anti-spyware security services, vulnerability-based security services, cloud-based malware detection security services, data loss prevention security services, and Domain Name System (DNS) security services. Type and configuration of security services can vary by security provider implementing the system and/or firewalls providing configuration data and traffic logs to the system.

At block 315, the system determines whether the security configuration for the role pair conforms to the best practices. For instance, conformance to the best practices can be based on security services implemented at the firewall for the zone at least including the security services indicated in the best practice security service configuration and currently implemented security services having best practice configurations. If the security configuration for the role pair conforms to the best practices, operational flow proceeds to block 317. Otherwise, operational flow skips to block 319.

At block 317, the system flags the zone for incorrect security service configuration. For instance, the system can generate an alert to the administrator of the organization that indicates the zone, the identified source/destination roles, and the incorrectly configured security services as well as recommended security services according to best practices. The system can further update a user display for the organization (e.g., a graphical user interface). The user display can indicate correct/incorrect security configurations per-source/destination role pair type, per zone, per source entity, per destination entity, per firewall, per security service, etc. across an organization. The user display can further comprise hyperlinks to analytics comprising historical trends such as graphs of percentage of correctly configured zones per-security service for an organization against industry standards.

At block 319, the system continues iterating through zones. If there is an additional zone, operational flow returns to block 309. Otherwise, operational flow returns to block 300.

FIG. 4 is a flowchart of example operations for identifying source and destination roles for a zone based on configuration data and traffic logs. Blocks 401 and 403 depict operations for aggregating traffic logs per-flow and generating attributes for each flow indicated in the traffic logs. These operations can occur independently of the remaining operations in FIG. 4, for instance by one or more firewalls maintaining traffic logs across an organization, as indicated by the dashed line surrounding blocks 401 and 403. Data for traffic logs and attributes of flows can be periodically discarded based on operational constraints at the organization and, in some embodiments, collection and aggregation of traffic logs and generation of attributes per-flow can occur based on prompting assessment of security configuration gaps for a zone at a firewall of the organization.

At block 401, a firewall aggregates per-flow traffic logs for network traffic of an organization across a zone. For instance, the firewall can generate log files for packets across traffic flows and can associate each log with a corresponding identifier of a traffic flow. The firewall can generate identifiers of flows based on source/destination physical/virtual interfaces and corresponding protocols, application identifiers, etc.

At block 403, the firewall generates a set of attributes for each flow indicated in the traffic logs. For instance, the firewall can maintain a set of attributes for each flow and, based on logs of packets corresponding to flows, update attributes of the traffic flow according to metadata in the logs. Logging of packets can occur inline at the firewall, and the firewall can initialize/update attributes of each flow and subsequently discard packet logs after performing additional cybersecurity operations. Metadata fields present in the attributes can comprise source/destination IP addresses/ports, application types, application categories/subcategories, protocols, risk scores, etc.

At block 405, the system clusters sets of attributes across flows to generate feature values for representative sets of attributes of each cluster. For instance, the system can preprocess sets of attributes corresponding to each flow by converting string attributes into numerical values, normalizing attributes, etc. prior to clustering. Depending on whether the clustering algorithm according to which the system clusters the sets of attributes can handle multiple types (e.g., numerical, string) of attributes, the system can process outputs of the clustering algorithm into numerical values as the feature values. Examples of the clustering algorithm include k-means clustering or ANN clustering algorithms involving locality-sensitive hashing. The number of clusters generated can correspond to the number of application identifiers or categories indicated in the sets of attributes (i.e., the clustering algorithm can generate a cluster for each application identifier and/or category), can be a preset number of clusters, can be determined with data analysis by the clustering algorithm, can be determined with an algorithm that determines a knee in the number of clusters, etc. In some embodiments, the system further subdivides each cluster into sub-clusters based on application identifiers, application categories, etc. for sets of attributes therein.

At block 407, the system extracts configuration feature values from configuration files corresponding to the zone. The system extracts configuration feature values according to a format of configuration files specified by the firewall, for instance from particular metadata fields in the configuration files. The system can further process the extracted feature values to conform to corresponding feature values generated from clustering sets of attributes generated from traffic logs in the foregoing, e.g., by conforming style and type of feature values.

At block 409, the system applies rules to the feature values to identify a source/destination role pair for the zone. The rules can comprise logical predicates applied to the feature values, with each logical predicate outputting a true/false value for a source/destination role pair. The logical predicates can be engineered such that exactly one is true and the rest are false. Alternative rules, such as rules that generate confidence scores for each source/destination role pair and choose the pair with maximal confidence score can be implemented.

At block 411, the system generates a confidence score for the identified source/destination role pair. The confidence score comprises a weighted combination of feature values, with weights depending on the identified source/destination role pair and higher weights assigned to feature values extracted from traffic logs.

FIG. 5 depicts example visualizations of analytics for security configuration gaps. A first visualization 500 indicates recommended security services for a firewall "Host 1" with model "Model 1" at each zone as well as hyperlinks for viewing associated policies at each zone. A first zone with source role DMZ and destination role DMZ has a URL filtering security service not configured and has DNS, IoT, and SaaS security services configured. A second zone with source role internal users and destination role the Internet has URL filtering and DNS security services not configured and no security services configured. A second visualization 510 indicates role to security service mappings for pairs of roles. A first role pair with source role of a data center and destination role of a DMZ with recommended security services of antivirus and URL filtering. A second role pair with source role of the Internet and destination role of information technology (IT) infrastructure has recommended security services of DNS and antivirus. A third visualization indicates zone to role mappings per-firewall at an organization. At a firewall "Firewall 1", a zone named "ImaZone" has a system inferred role of an internal branch and no user defined role and a zone named "ImalsoaZone" has a system inferred role of the Internet and no user defined role.

FIG. 6 depicts additional example visualizations of analytics for security configuration gaps. A first visualization 600 comprises analytics of the number of firewalls correctly configured per-security service and indicates that for the URL filtering security service, 10 firewalls are not activated, 67 firewalls are not configured, and 87 firewalls are not following best practices. A second visualization 610 indicates metadata for zones identified as a pair comprising roles of data center and Internet and comprises a first zone with URL filtering, DNS, and IoT security services not configured, a rule name of Rule1 defining associated security policies at the firewall, a source role labelled Source1 by the organization, a source address of SourceAd1, a destination role labelled as Dest1 by the organization, and a destination address of DestAd1. The second visualization 610 further indicates comprises a second zone with URL filtering and DNS security services not configured, a rule name of Rule2 defining associated security policies at the firewall, a source role labelled Source2 by the organization, a source address of SourceAd2, a destination role labelled as Des21 by the organization, and a destination address of DestAd2.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 301 and 305 can be performed in parallel or concurrently. With respect to FIG. 4, generating a confidence score at block 411 is not necessary. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
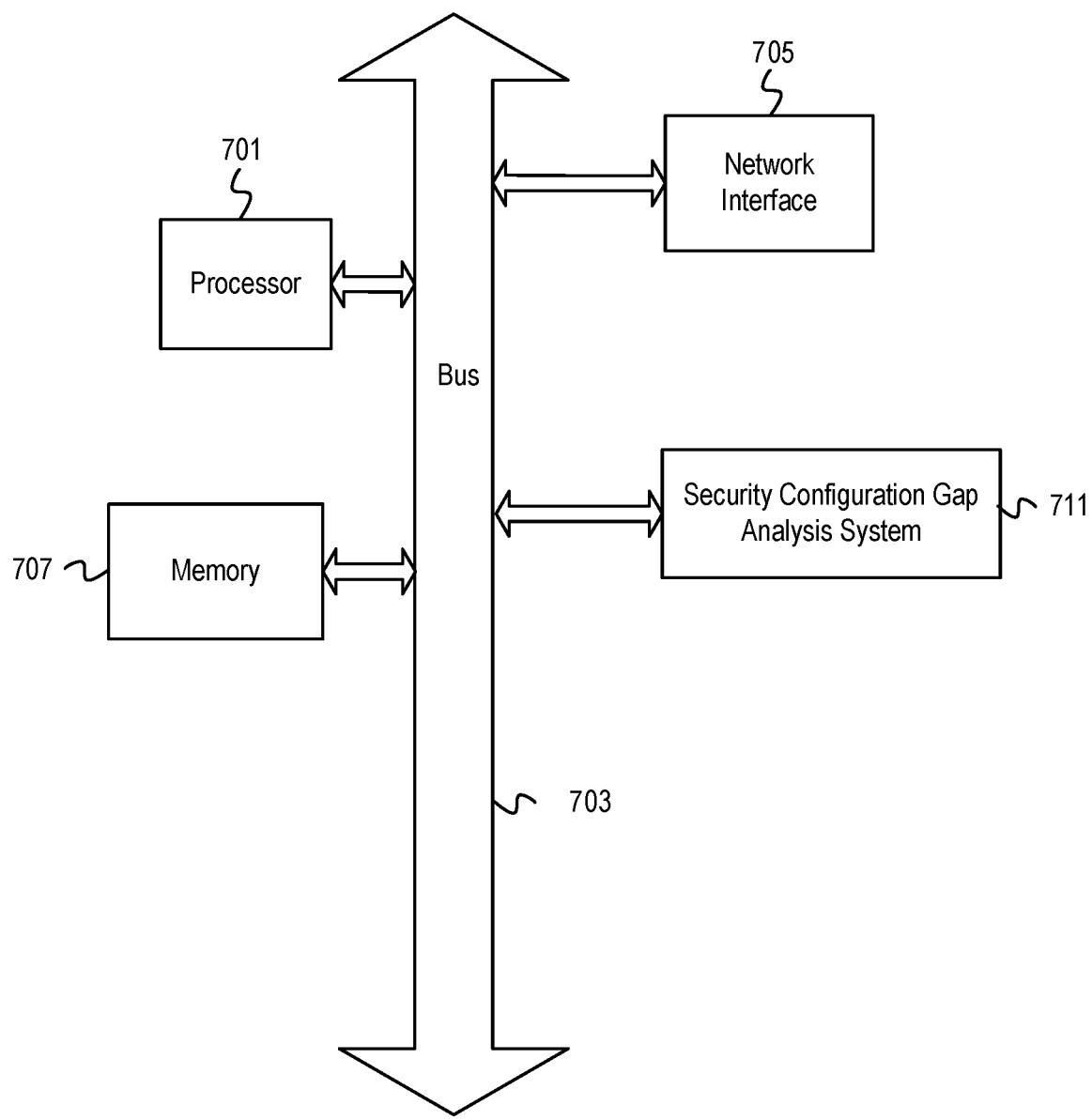
FIG. 7 depicts an example computer system with a security configuration gap analysis system.

FIG. 7 depicts an example computer system with a security configuration gap analysis system. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes a security configuration gap analysis system (system) 711. The system 711 is configured to identify security services not implemented or not correctly implemented by a firewall of an organization based on identify source/destination role pairs for zones monitored by the firewall. The system 711 identifies source/destination role pairs by generating feature values from configuration files and clusters of traffic logs at each zone and applying rules to the feature values. The system 711 compares identified roles to best practice configurations for each source/destination role pair to identify security services not implemented or not correctly implemented. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

The invention claimed is:

1. A method comprising:
   generating a first plurality of feature values representative of a plurality of settings in a security configuration of a grouping of at least one of physical interfaces and virtual interfaces at a firewall;
   clustering flows of network traffic to identify clusters of sets of attributes of network traffic, wherein the flows of network traffic occur at the grouping of at least one of physicals interfaces and virtual interfaces;
   generating a second plurality of feature values representative of the clusters of sets of attributes of network traffic;
   determining a first role and a second role of source entities and destination entities of the flows of network traffic, respectively, based, at least in part, on the first plurality of feature values and the second plurality of feature values, wherein the first role and the second role comprise descriptors of security policies implemented at respective physical interfaces and virtual interfaces at the at least one of physical interfaces and virtual interfaces; and
   identifying a gap in security posture of at least a subset of the grouping of the at least one of physical interfaces and virtual interfaces based on the first role and the second role.

2. The method of claim 1, wherein determining the first role and the second role comprises applying one or more logical rules to the first plurality of feature values and the second plurality of feature values.

3. The method of claim 1, further comprising determining a confidence score for the first role and second role, wherein determining the confidence score comprises, computing a weighted sum of the first plurality of feature values and the second plurality of feature values; and
  determining the first and second role as one of a plurality of pairs of roles corresponding to a range of values that includes the weighted sum.

4. The method of claim 3, wherein the weighted sum applies weights based on the first role and the second role, wherein the weighted sum applies higher weights to the second plurality of feature values and lower weights to the first plurality of feature values.

5. The method of claim 1, wherein the first plurality of feature values comprises Boolean indicators of criteria of access from the grouping of at least one of physical interfaces and virtual interfaces and characteristics of applications detected in the flows of network traffic.

6. The method of claim 1, wherein clustering the flows of network traffic comprises clustering sets of attributes of the flows of network traffic with approximate nearest neighbors clustering.

7. The method of claim 1, wherein the sets of attributes of network traffic comprise metadata fields captured from each of the flows of network traffic.

8. The method of claim 1, wherein identifying the gap in security posture of at least a subset of the grouping of the at least one of physical interfaces and virtual interfaces comprises:
  identifying recommended security services for virtual and physical interfaces associated with the first role and the second role; and
  identifying a subset of the recommended security services as at least one of not implemented and not correctly implemented for the grouping of at least one of physical interfaces and virtual interfaces.

9. A non-transitory, machine-readable medium having program code stored thereon, the program code comprising instructions to:
  parse a configuration file for at least one of physical interfaces and virtual interfaces at a firewall to extract a plurality of security settings for the at least one of physical interfaces and virtual interfaces;
  identify subsets of flows of network traffic across the at least one of physical interfaces and virtual interfaces, wherein the subsets of flows of network traffic are associated with corresponding ones of a plurality of attributes of network traffic;
  determine a first role and a second role of source entities and destination entities of the flows of network traffic, respectively, based, at least in part, on the plurality of security settings and the plurality of attributes of network traffic, wherein the first role and the second role comprise descriptors of security policies implemented at respective physical interfaces and virtual interfaces at the at least one of physical interfaces and virtual interfaces; and
  identify a gap in security posture of at least a subset of a grouping of the at least one of physical interfaces and virtual interfaces based on the first role and the second role.

10. The non-transitory, machine-readable medium of claim 9, wherein the instructions to determine the first role and the second role of the source entities and the destination entities of the flows of network traffic comprise instructions to,
  generate a first plurality of feature values for the plurality of security settings and a second plurality of feature values for the plurality of attributes of network traffic; and
  determine the first and second roles as one of a plurality of pairs of roles indicated in output of logical rules obtained by inputting the first plurality of feature values and the second plurality of feature values.

11. The non-transitory, machine-readable medium of claim 10, further comprising generating a confidence score for the first role and the second role as a weighted sum of the first plurality of feature values and the second plurality of feature values, wherein the weighted sum applies higher weights to the second plurality of feature values and lower weights to the first plurality of feature values.

12. The non-transitory, machine-readable medium of claim 10, wherein the first plurality of feature values comprises Boolean indicators of criteria of access from the at least one of physical interfaces and virtual interfaces and security scores generated, at least in part, from applications detected in the flows of network traffic.

13. The non-transitory, machine-readable medium of claim 9, wherein the instructions to identify the subsets of flows of network traffic comprise instructions to cluster sets of attributes of the flows of network traffic, wherein the sets of attributes comprise metadata fields captured from each of the flows of network traffic.

14. The non-transitory, machine-readable medium of claim 9, wherein the program code instructions to identify a gap in security posture of at least the subset of a grouping of the at least one of physical interfaces and virtual interfaces comprises instructions to:
  identify recommended security services for virtual and physical interfaces associated with the first role and the second role; and
  identify a subset of the recommended security services as at least one of not implemented and not correctly implemented for the at least one of physical interfaces and virtual interfaces.

15. An apparatus comprising:
a processor; and
a machine-readable medium having instructions stored thereon that are executable by the processor to cause the apparatus to,
  identify a plurality of security settings for flows of network traffic across at least one of physical interfaces and virtual interfaces at a firewall, wherein the at least one of physical interfaces and virtual interfaces are associated with a security policy at the firewall that codifies the plurality of security settings;
  generate a first plurality of feature values from the plurality of security settings;
  analyze one or more of the flows of network traffic to identify sets of attributes of one or more subsets of the flows of network traffic;
  generate a second plurality of feature values from the attributes of the flows of network traffic;
  determine a first role and a second role of source entities and destination entities of the flows of network traffic, respectively, based, at least in part, on the first plurality of feature values and the second plurality of feature values; and
  identify a gap in security posture of at least a subset of a grouping of the at least one of physical interfaces and virtual interfaces based on the first role and the second role.

16. The apparatus of claim 15, wherein the instructions to determine the first and second roles of the source entities and the destination entities of the flows of network traffic comprise instructions executable by the processor to cause the apparatus to, input the first plurality of feature values and the second plurality of feature values into logical rules to obtain the first role and the second role as output.

17. The apparatus of claim 16, further comprising instructions executable by the processor to cause the apparatus to compute a confidence score of the first role and the second role as a weighted sum of the first plurality of feature values and the second plurality of feature values, wherein the weighted sum applies higher weights to the second plurality of feature values and lower weights to the first plurality of feature values.

18. The apparatus of claim 15, wherein the first plurality of feature values comprises Boolean indicators of criteria of access from the at least one of physical interfaces and virtual interfaces and security scores generated, at least in part, from applications detected in the flows of network traffic.

19. The apparatus of claim 15, wherein the instructions to analyze one or more of the flows of network traffic to identify sets of attributes of one or more subsets of the flows of network traffic comprise instructions executable by the processor to cause the apparatus to,
  cluster the flows of network traffic into the one or more subsets according to metadata fields captured from the flows of network traffic; and
  determine the sets of attributes as common attributes among corresponding subsets of the one or more subsets of the flows of network traffic.

20. The apparatus of claim 18, wherein the instructions to cluster the flows of network traffic comprise instructions executable by the processor to cause the apparatus to cluster the flows of network traffic with approximate nearest neighbors clustering.

* * * * *